(12) United States Patent
Nicholson et al.

(10) Patent No.: US 7,696,922 B2
(45) Date of Patent: Apr. 13, 2010

(54) METHOD AND APPARATUS FOR GEOLOCATION DETERMINATION

(75) Inventors: Peter Nicholson, Bulli (AU); Neil Harper, Mangerton (AU)

(73) Assignee: Andrew LLC, Hickory, NC (US)

( * ) Notice: Subject to any disclaimer, the term of this patent is extended or adjusted under 35 U.S.C. 154(b) by 3 days.

(21) Appl. No.: 12/201,252

(22) Filed: Aug. 29, 2008

(65) Prior Publication Data

US 2009/0085802 A1 Apr. 2, 2009

Related U.S. Application Data

(62) Division of application No. 11/405,404, filed on Apr. 18, 2006, now Pat. No. 7,436,355.

(51) Int. Cl.
*G01S 1/00* (2006.01)
(52) U.S. Cl. .................................. 342/357.03
(58) Field of Classification Search ................................
342/357.01–357.17
See application file for complete search history.

(56) References Cited

U.S. PATENT DOCUMENTS

| | | | |
|---|---|---|---|
| 5,808,581 A | 9/1998 | Braisted et al. | |
| 6,727,850 B2 | 4/2004 | Park et al. | |
| 6,865,484 B2 | 3/2005 | Miyasaka et al. | |
| 6,961,660 B2 | 11/2005 | Underbrink et al. | |
| 7,209,077 B2 | 4/2007 | Harper | |
| 7,436,355 B2 * | 10/2008 | Nicholson et al. | 342/357.03 |
| 2003/0004640 A1 * | 1/2003 | Vayanos | 701/213 |
| 2005/0248687 A1 | 11/2005 | Lee et al. | |
| 2007/0200752 A1 | 8/2007 | van Diggelen et al. | |

* cited by examiner

*Primary Examiner*—Thomas H Tarcza
*Assistant Examiner*—Nga X Nguyen
(74) *Attorney, Agent, or Firm*—Duane Morris LLP (57) ABSTRACT

The disclosure relates to method and apparatus for geolocation determination. In one embodiment, the disclosure relates to a method for detecting an erroneous satellite measurement by a receiver, including the steps of (a) determining an approximate location of the receiver; (b) for each of a plurality of satellites from which the receiver receives a signal: (i) determining a range difference between an expected range between the receiver and the satellite and a measured range between the receiver and the satellite; (ii) determining a median value of the range differences; (iii) determining an offset value between the range difference and the median value; (iv) comparing the offset value with a predetermined threshold to thereby detect an erroneous satellite measurement.

36 Claims, 5 Drawing Sheets

410 Determining range difference between expected range and measured range

420 Determining median value of range differences

430 Determining offset value between range difference and median value

440 Compare offset value with predetermined threshold to detect erroneous satellite measurement

METHOD AND APPARATUS FOR GEOLOCATION DETERMINATION

BACKGROUND

It has become increasingly important to determine the location of a mobile telephone or other mobile device capable of radio communication. One method of assessing geolocation of a mobile device is using the mobile device in conjunction with a geolocation system. Such geolocation systems include, for example, the Navstar Global Positioning System (i.e., GPS). GPS is a radio positioning system which provides its subscribers with highly accurate position, velocity, and time (PVT) information. The GPS includes a constellation of GPS satellites in non-geosynchronous 12 hour orbits around the earth.

Figure 1:
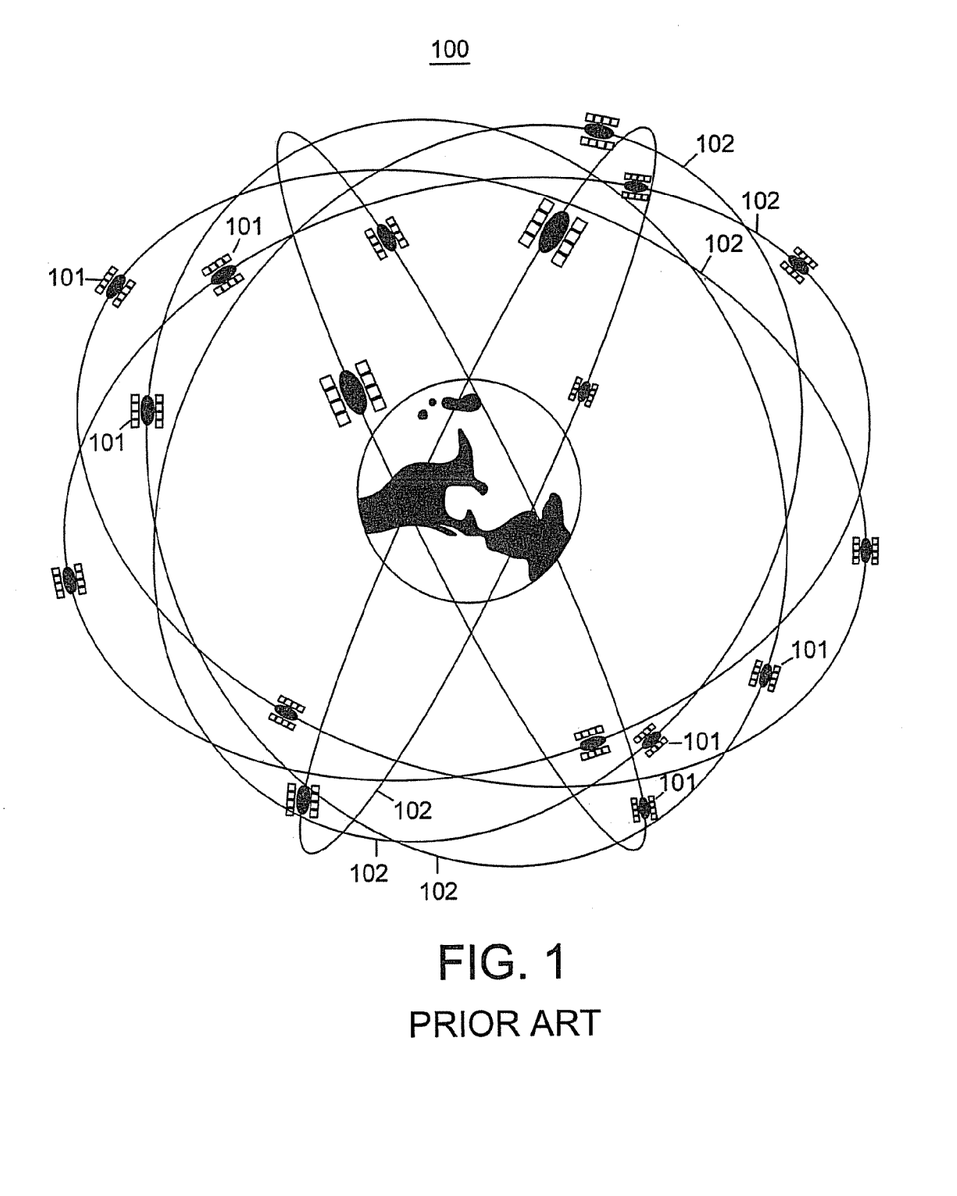
FIG. 1 is a schematic representation of a constellation of GPS satellites.

FIG. 1 is a schematic representation of constellation 100 of GPS satellites 101. The GPS satellites 101 travel in six orbital planes 102 with four of the GPS satellites 101 in each plane, plus a number of on orbit spare satellites. Each orbital plane has an inclination of 55 degrees relative to the equator. In addition, each orbital plane has an altitude of approximately 20,200 km (10,900 miles). The time required to travel the entire orbit is about 12 hours. Thus, at any given location on the surface of the earth at least five GPS satellites are visible at any given time.

GPS position determination is made based on the time of arrival (TOA) of various satellite signals. Each of the orbiting GPS satellites 101 broadcasts spread spectrum microwave signals encoded with positioning data and satellite ephemeris information. The signals are broadcast on two frequencies: 1575.42 MHz (L1) and 1227.60 MHz (L2). The L1 frequency carries the navigation data as well as the standard positioning code, while the L2 frequency carries only the P code and is used for precision positioning code for military applications. The signals are modulated using bi-phase shift keying techniques. The signals are broadcast at precisely known times and at precisely known intervals and each signal is encoded with its precise transmission time.

A GPS subscriber receives the signals with a GPS receiver configured to time the signals and to demodulate the satellite orbital data (ephemeris information) contained in each signal. Using the ephemeris information, the receiver can determine the time difference between transmission of the signal by the satellite and its reception by the receiver. Multiplying the time difference by the speed of light provides a pseudo range measurement of that satellite. Assuming that the receiver's clock is perfectly synchronized with the satellite clocks, this information could yield actual range measurement for each satellite. However, the clock drift at the receiver can cause it to differ by time offset value thereby making the accuracy of a pseudo range measurement questionable.

Because the time offset is common to the pseudo range measurement of all the satellites, the pseudo ranges of four or more satellites enables the GPS receiver to determine the time offset and its location in three dimensions. Thus, a receiver is able to determine his PVT with great accuracy, and use this information to navigate safely and accurately from point to point, among other uses.

However, the signal received from each of the visible satellites does not necessarily result in an accurate position estimation. The satellite pseudo-ranges measured and reported by GPS receivers are sometimes inaccurate. For example, this may occur due to "multipath" effects, i.e., where the GPS signal has not taken a direct path to the receiver but instead has, for example, bounced off a building.

Accordingly, there is a need for a method and apparatus for geolocation determination that would overcome this problem.

SUMMARY OF THE DISCLOSURE

In one embodiment, the disclosure relates to a method for detecting an erroneous satellite measurement from a signal sent by a satellite and received by a receiver, comprising the steps of: (a) determining an approximate location of the receiver; (b) for each one of a plurality of satellites from which the receiver receives a signal: (i) determining a range difference between an expected range between the receiver and the satellite and a measured range between the receiver and the satellite; (ii) determining a median value of the range differences; (iii) determining an offset value between the range difference and the median value; (iv) comparing the offset value with a predetermined threshold to thereby detect an erroneous satellite measurement.

In another embodiment, the disclosure relates to a method for determining the location of a receiver receiving signals from a plurality of GNSS satellites in which one of the received signals is erroneous, comprising the steps of: (a) determining an approximate location of the receiver; (b) for each one of the plurality of satellites: (i) determining an expected range between the receiver and the satellite; (ii) measuring a range between the receiver and the satellite; (iii) determining a range difference between the expected range and the measured range; (iv) determining a median value of the range differences; (v) determining an offset value between the range difference and the median value; (vi) comparing the offset value with a predetermined threshold to thereby detect an erroneous satellite measurement; (c) determining if there are at least four offset values less than the predetermined threshold; (d) determining the location of the receiver using the range measurements from the satellites for which the offset values are less than the predetermined threshold.

In still another embodiment, the disclosure relates to an improved method for determining the location of a receiver receiving signals from a plurality of GNSS satellites, the improvement comprising the steps of (a) determining an approximate location of the receiver; (b) for each one of the plurality of satellites, determining an accuracy of a range measurement between the receiver and the satellite as a function of the approximate location of the receiver; (c) determining the location of the receiver using only those range measurements determined to be accurate within a predetermined threshold.

In still another embodiment, the disclosure relates to an apparatus for receiving signals from a satellite and detecting an erroneous satellite measurement therefrom, comprising: means for determining an approximate location of the apparatus; a receiver for receiving said satellite signals; circuitry for determining a range difference between an expected range between the apparatus and the satellite and a measured range between the apparatus and the satellite; circuitry for determining a median value of the range differences; circuitry for determining an offset value between the range difference and the median value; circuitry for comparing the offset value with a predetermined threshold to thereby detect an erroneous satellite measurement.

In still another embodiment, the disclosure relates to an apparatus for determining location from signals received from a plurality of GNSS satellites in which one of the received signals is erroneous, comprising means for determining an approximate location of the receiver; a receiver for receiving said satellite signals; circuitry for determining an expected range between the apparatus and the satellite; circuitry for measuring a range between the apparatus and the satellite; circuitry for determining a range difference between the expected range and the measured range; circuitry for determining a median value of the range differences; circuitry for determining an offset value between the range difference and the median value; circuitry for comparing the offset value with a predetermined threshold to thereby detect an erroneous satellite measurement; circuitry for determining if there are at least four offset values less than the predetermined threshold; circuitry for determining the location of the apparatus using the range measurements from the satellites for which the offset values are less than the predetermined threshold.

In still another embodiment, the disclosure relates to an improved apparatus for determining location from signals received from a plurality of GNSS satellites, the improvement comprising: means for determining an approximate location of the apparatus; a receiver for receiving said satellite signals; circuitry for determining an accuracy of a range measurement between the apparatus and the satellite as a function of the approximate location of the apparatus; determining the location of the apparatus using only those range measurements determined to be accurate within a predetermined threshold.

In yet another embodiment, the disclosure relates to a method for detecting an erroneous satellite measurement from a signal sent by a satellite and received by a receiver, comprising the steps of (a) determining an approximate location of the receiver; (b) determining an elevation for each of a plurality of satellites from which the receiver receives a signal; (c) for each one of the plurality of satellites: (i) determining an uncertainty value as a function of the satellite elevation; (ii) determining an expected range between the receiver and the satellite; (iii) measuring a range between the receiver and the satellite; (iv) determining a range difference between the expected range and the measured range; (v) determining a median value of the range differences; (vi) determining an offset value between the range difference and the median value; (vii) comparing the offset value with a value that is the sum of the uncertainty value and a predetermined threshold to thereby detect an erroneous satellite measurement.

In still another embodiment, the disclosure relates to a method for detecting an erroneous satellite measurement from a signal sent by a Global Navigation Satellite System ("GNSS") satellite and received by a receiver, where the receiver is receiving signals from a cellular communication network, comprising the steps of: (a) determining an approximate location of the receiver as a function of an area of a cell in the cellular communication network; (b) determining an elevation each for a plurality of satellites from which the receiver receives a signal as a function of ephemeris information received from at least one of the plurality of satellites; (c) for each one of the plurality of satellites: (i) determining an uncertainty value as a function of the satellite elevation and the approximate location of the receiver; (ii) determining an expected range between the receiver and the satellite as a function of the ephemeris information and the approximate location of the receiver; (iii) measuring a range between the receiver and the satellite from a signal transmitted by the satellite and received by the receiver (iv) determining a range difference between the expected range and the measured range; (v) determining a median value of the range differences; (vi) determining an offset value between the range difference and the median value; (vii) comparing the offset value with a value that is the sum of the uncertainty value and a predetermined threshold to thereby detect an erroneous satellite measurement.

DETAILED DESCRIPTION

The disclosure relates to methods and apparatus for determining geolocation using satellite signals as well as for detecting erroneous error signals. The satellites can be considered as part of a Global Navigation Satellite System ("GNSS"), such as, for example, the U.S. Global Positioning System ("GPS"). While the following description references the GPS system, this in no way should be interpreted as limiting the disclosure to the GPS system. As is known to those of skill in the art, other GNSS systems operate, for the purposes of this disclosure, similarly to the GPS system, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou. Therefore, references in the disclosure to GPS and/or GNSS, where applicable, as known to those of skill in the art; apply to the above-listed GNSS systems as well as other GNSS systems not listed above.

As stated, the satellite signals are transmitted along two frequencies L1 and L2. The L1 frequency carries navigation data and the standard positioning code while the L2 frequency only carries the P code which is used by receivers designated for PPS (precision positioning code). The carrier phases are modulated by different binary codes. One such carrier phase is the coarse acquisition (C/A) code and another is the Psuedo Random Noise (PRN). The C/A code is a 1024 chip long code which is transmitted with a frequency of 1.023 MHz. Using the C/A code, the carrier signals are modulated and the bandwidth of the main frequency band is spread from 2 MHz to 20 MHz to reduce interference. The PRNs are used to identify the satellites and the PRN-numbers of the satellites appear on the satellite view screens of a typical GPS receiver. While the exemplary embodiments disclosed herein are directed to systems with 1024 chips, the principles of the invention are not limited thereto and can be equally adapted to systems not using modulo 1024.

The fundamental measurement that a GPS receiver makes is of the code-phase for a particular satellite. Code-phase is also referred to as "GPS chips" since it is a measure of the number of C/A code chips. Code-phase is the offset in time between the measured Pseudo Random Noise (PRN) code transmitted by the satellite and the locally generated replica. The generation of the local replica is driven by the handset clock.

In certain conventional cellular networks, for example, but not limited to, the Global System for Mobile Communications ("GSM") and the Universal Mobile Telecommunications System ("UTMS"), the handset clock is not synchronized with GPS time. This means that the code phase measurement is highly dependent on the clock error of the handset. For example, a handset clock that is half a millisecond different to GPS time will have a predicted code phase that is incorrect by half of its total range by 511 chips. Handset or receiver clock errors of many milliseconds are common, so predicted code phase, and measure code phase bear no absolute relationship. Since the reported code phase measurements are all equally affected by the clock offset of the receiver, they cannot be compared directly to the predicted chips. It is the relative code phases that are important. If the GPS measurements are all valid then they will all be offset by the same number of chips from the predicted chips.

Thus, one embodiment of the disclosure relates to a method for detecting erroneous satellite measurements whereby the receiver's measured code-phase value for a satellite is compared with a predicted code-phase value for that satellite. If the measured code-phase value substantially deviates from the predicted code-phase value, then the information received from the particular satellite is not used in the geolocation estimation.

Figure 2:
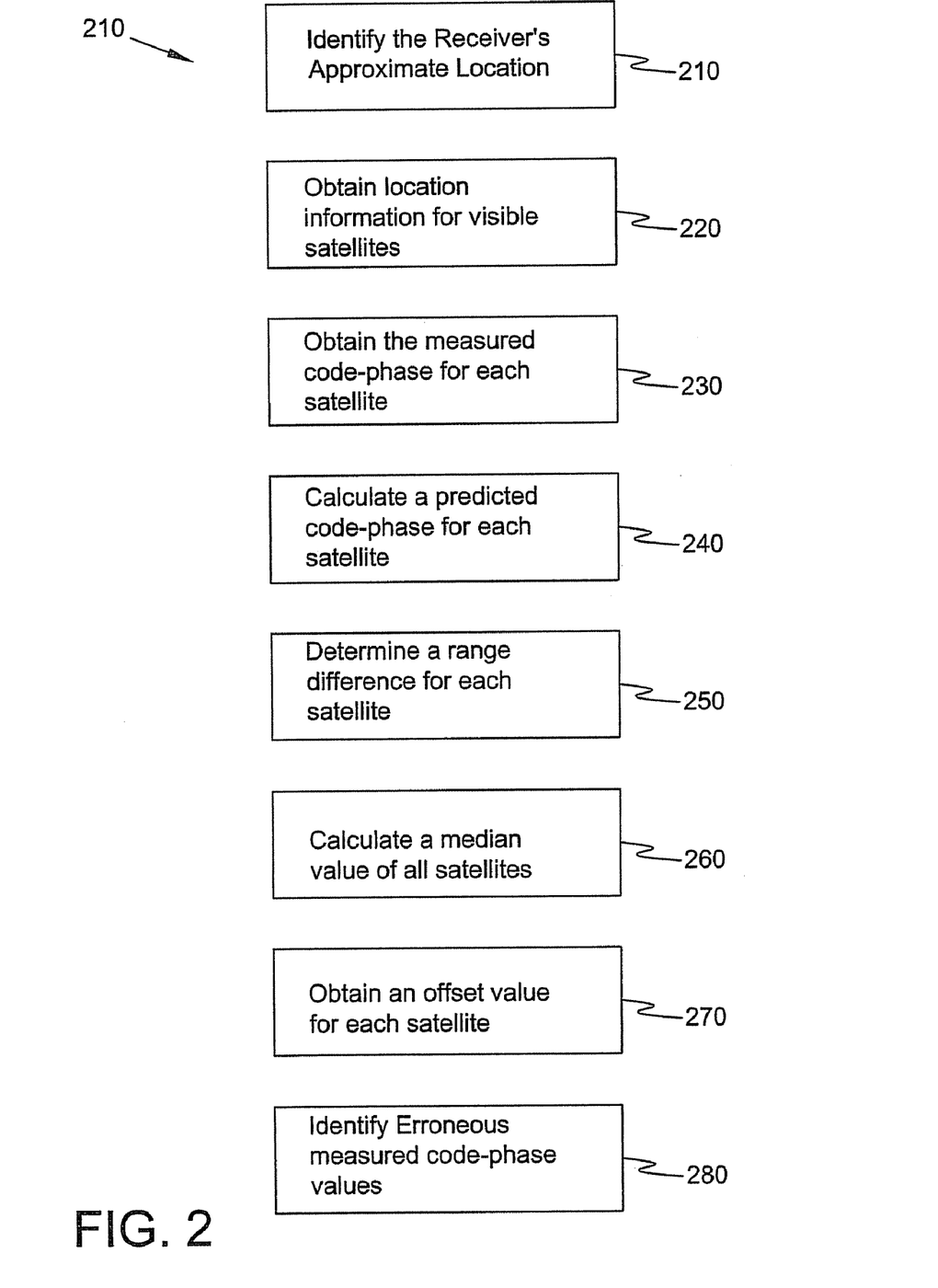
FIG. 2 is an algorithm according to one embodiment of the disclosure.

FIG. 2 is an algorithm according to one embodiment of the disclosure. Referring to the algorithm 200 of FIG. 2, in step 210, the receiver identifies its approximate location. Step 210 can be implemented at the GPS receiver (interchangeably, the subscriber) or at a different location and communicated to the receiver. For example, if the receiver is adapted to receive cellular signals (e.g., the receiver is part of a cell phone), the receiver can obtain its approximate location from the cell network's Mobile Switching Center ("MSC"). The MSC can identify the cell in which the mobile is located or the location of the closest base station. This information enables the receiver to have a general understanding of its location. (i.e., the receiver is in an area serviceable by the identified cell.) It should also be noted that a receiver is only one exemplary means for implementing the embodiments disclosed herein and other means such as a transceiver (e.g., cell phone) can be equally used without departing from the principles of the disclosure.

In step 220, the receiver identifies satellites within its line of sight. At any given time, 4-7 satellites maybe visible from any location on earth. The receiver identifies the satellite and its location information. The location information can be obtained, for example, by collecting broadcast ephemeris information from one or more of the visible GPS satellites. The location information can also be obtained from a source other than the satellite itself. For example, the MSC can be configured to track the location of each satellite and provide this information to the mobile receiver upon request.

In step 230, the GPS device in the receiver measures the code-phase for each satellite, a is known in the art. The measured code-phase value can be a number in the range of 0-1023 chips. In step 240, the expected range from the user to the visible satellite is calculated. The expected or predicted code-phase value can be a number in the range of 0-1023. This step can be repeated for each visible satellite or for select few visible satellites.

In step 250, the GPS device determines a variance code-phase value for each satellite. In one embodiment, the variance code-phase value (interchangeably, the range difference value) is the difference between the expected code-phase and the measured code-phase values. Other mathematical relationship that can quantify the degree of disparity between the expected and the measured code-phase values may also be used. If the range difference value is defined as the difference between the expected code-phase and the measured code-phase values (or alternatively, as the difference between the measured and expected code-phase values), the difference must take into account the "shortest distance" between the two values as well as the 0-1023 modulo chip range. By way of example, the shortest distance between 100 and 900 chip is 224. In one embodiment, the variance is calculated by Equation (1) as follows:

Variance Code Phase $n$=min((measured $n$−predicted $n$+1024)mod.1024, (predicted $n$−measured $n$+1024)mod.1024); where n identifies code-phase for a given satellite.

The variance code phase determined according to Equation (1) can be used in step 260 to calculate a median code phase for all visible satellites. Alternatively, an average code phase can be determined instead of a median code phase.

In step 270, the difference between each variance code phase value n and the median code-phase value is calculated and identified as the offset value for the subject satellite. Alternatively, the difference between each variance code phase value n and the median code-phase value is calculated and identified as the offset value for the subject satellite.

Finally, in step 280 the offset code-phase value for each satellite is compared with a constant tolerance or threshold value. If the offset value is greater than the threshold then the code-phase measurements from that satellite is deemed invalid and ignored for GPS calculations. Accordingly, the remaining values are used by the GPS receiver to obtain a more accurate estimate of the receiver's location. After repeating the process for all visible satellites, if there are at least four valid code-phase measurements, then accurate estimation of the location can be made. The process may also be implemented for only a subset of the visible satellites to identify at least four valid code-phase measurements among the subset.

The threshold value can be a constant tolerance value or it can be determined iteratively to selectively eliminate the least accurate satellite measurements. Exemplary threshold values include 4, 2 and 1. Satellite measurements can be sorted and/or arranged by the value of their offset from the expected code phase. For example, satellite measurements with the largest deviation from expectations can be, for example, considered to be at the head of a sorted list of offset values. The least accurate measurements can be discarded by removing a value from the head of the list thereby leaving the most accurate measurements. This process can be repeated as necessary, provided there are, for example, at least four satellites remaining on the list at the end of the process.

Figure 3:
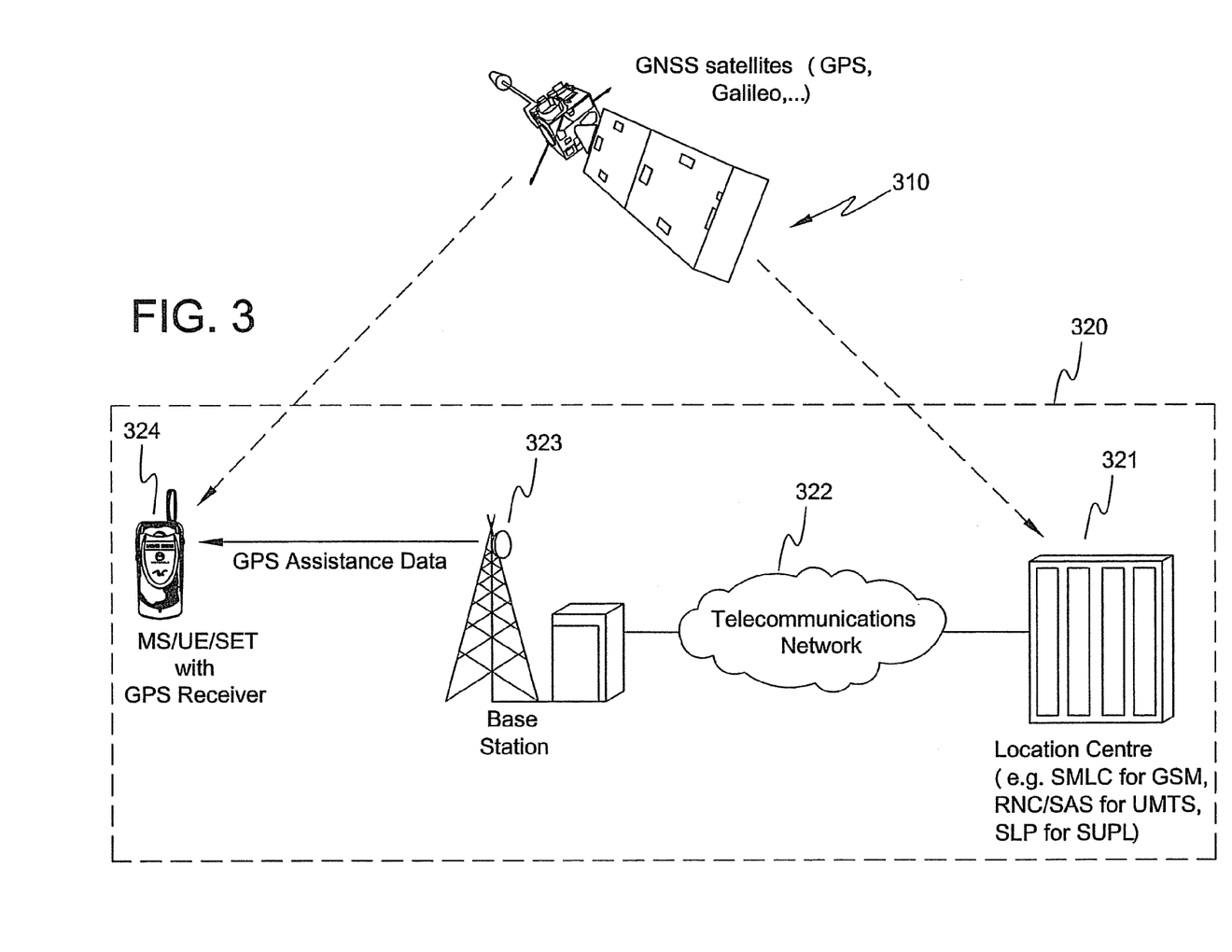
FIG. 3 is a schematic representation for implementing one embodiment of the disclosure.

FIG. 3 is a schematic representation for implementing one embodiment of the disclosure. Referring to FIG. 3, satellite system 310 communicates with ground system 320. System 320 includes a cellular network having a location center 321. Location center 321 can be a mobile switching center or any central office configured to communicate with telecommunication network 322. The location center communicates with telecommunication network 322 and base station 323. In one embodiment, handset 324 communicates with base station 323 to acquire GPS assistance data. Location center 321 can communicate a preliminary estimate of the receiver's location on the basis of the receiver's cell site or its closest base station(s). This information can then be relayed to the mobile receiver and used for location determination. Location center 321 can also receive satellite information from the GPS satellite. The satellite information may include the satellite's broadcast ephemeris information. The information may also include the altitude of the broadcasting satellite or that of all satellites. Location center 321 can relay the information back to the mobile receiver or use the information, either singularly or along with some preliminary estimation of the mobile's location, to assist the mobile in its geolocation determination.

In another embodiment, the steps illustrated in FIG. 2 can be implemented at location center 321 and communicated to the mobile receiver.

An apparatus according to one embodiment of the disclosure may include a receiver. The receiver can be used for cellular communication in any of the conventional communication formats. As stated, the receiver may be adapted to receiver cellular communication. The receiver can be, for example, a cellular telephone, a text messaging device, a computer, a portable computer, a vehicle locating device, a vehicle security device, a communication device, or a wireless telephone. If the receiver is a cellular telephone, the approximate location of the receiver can be defined as a function of an area of a cell in the cellular network, or alternatively, as a function of a location of one or more base stations in the cellular network.

The apparatus may also include one or more processors configured to process the geolocation information. In one embodiment, for example, a first processor or circuitry can be tasked with measuring the code-phase value for each satellite while another processor (or circuitry) can be tasked with determining the erroneous code-phase measurements. In another embodiment, one processor or circuitry can be used for both tasks. Such processor can be programmed with instructions similar to those represented in the exemplary embodiment of FIG. 2. For example, the GPS processor can be programmed to: (1) identify an approximate location of the apparatus; (2) obtain ephemeris information from the GPS satellites or another source; (3) calculate a predicted code-phase value for each visible satellite; (4) obtain a measured or predicted code-phase for each visible satellite; (5) obtain a variance code-phase for each satellite; (5) determine a median code-phase value; and (6) identify erroneous satellite measurements as a function of the offset code-phase value and the median code-phase value. Once the erroneous satellite measurements have been identified, the one or more GPS processor can make geolocation estimation based on the measurements obtained from the unaffected satellites.

Typically, at least four viable satellite measurements are needed to make an accurate geolocation determination. In one embodiment, an additional step can be implemented to determine whether there are at least four reliable offset values. (i.e., offset values less than the predetermined threshold.) If it is determined that there are less than four reliable offset values, then a decision can be made to either use the four most reliable of the offset values or obtain another set of measurements from one or all of the satellites.

Figure 4:
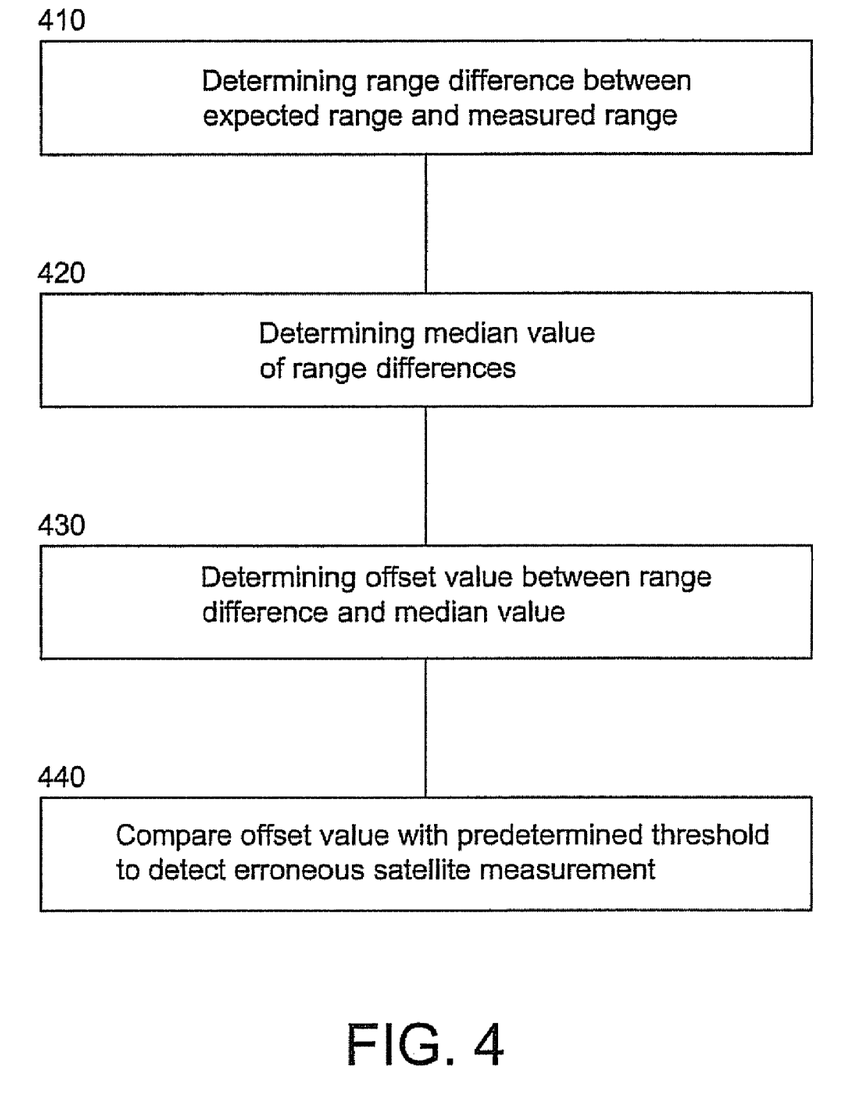
FIG. 4 is an algorithm according to another embodiment of the disclosure.

With reference to FIG. 4, in one embodiment, the disclosure is directed to a method for detecting an erroneous satellite measurement by determining an approximate location of the receiver. This step can be done in any of a number different ways. For example, the step can be implemented independently of the signals transmitted by the satellites and received by the receiver. Next, for each of the satellites from which the receiver receives a signal, the receiver can: (1) determine a range difference between an expected range between the receiver and the satellite and a measured range between the receiver and the satellite 410, (2) determine an offset value between the range difference and the median 420; (3) determining the offset value between the range difference and the median value 430; and (4) comparing the offset value with a predetermined threshold to identify erroneous satellite measurements 440. Once the erroneous satellite measurements have been identified, a more accurate estimation of the receiver's location can be made by disregarding the erroneous satellite measurements. It should be noted that the step (1) above can further include the steps of (i) determining an expected range between the receiver and the satellite; (ii) measuring the range between the receiver and the satellite; and (iii) determining the difference between the expected range and the measured range. The expected range can be calculated as a function of the approximate location of the receiver or as a function of its expected location. This value can be a approximate location or a range of locations.

In still another embodiment, the disclosure relates to an apparatus for receiving signals from a satellite and detecting an erroneous satellite measurement. The apparatus can include a circuitry (hardware or software) for determining an approximate location of the apparatus. The approximate location can be determined independent of signals transmitted by the satellites. The approximate location can also be determined independent of signals received by the receiver. The apparatus can also include a receiver for receiving said satellite signals, a circuitry for determining a range difference between an expected range between the apparatus and the satellite and a measured range between the apparatus and the satellite. The same circuitry or a supplemental circuitry can be used for determining a median value of the range differences. The same circuitry or a supplemental circuitry can be used for determining an offset value between the range difference and the median value. The same circuitry or an additional circuitry can be used for comparing the offset value with a predetermined threshold to thereby detect an erroneous satellite measurement.

Figure 5:
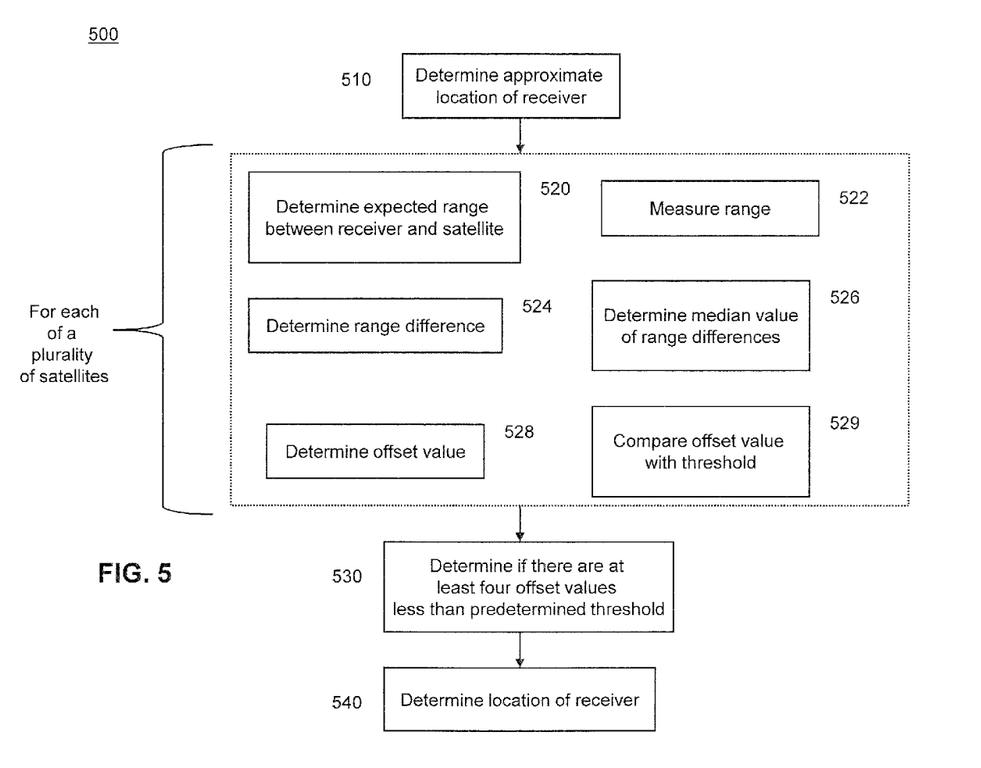
FIG. 5 is an algorithm according to one embodiment of the disclosure.

With reference to FIG. 5, in one embodiment, the disclosure is directed to a method for determining the location of a receiver receiving signals from a plurality of Global Navigation Satellite System ("GNSS") satellites in which one of the received signals is erroneous 500. The method may comprise the steps of determining an approximate location of the receiver at step 510 and for each one of the plurality of satellites: determine an expected range between the receiver and the satellite at step 520, measure a range between the receiver and the satellite at step 522, determine a range difference between the expected range and the measured range at step 524, determine a median value of the range differences at step 526, determine an offset value between the range difference and the median value at step 528, and compare the offset value with a predetermined threshold to thereby detect an erroneous satellite measurement at step 529. The method further comprises determining if there are at least four offset values less than the predetermined threshold at step 530 and, at step 540, determining the location of the receiver using the range measurements from the satellites for which the offset values are less than the predetermined threshold.

Although the disclosure is described using illustrative embodiments provided herein, it should be understood that the principles of the disclosure are not limited thereto and may include modification thereto and permutations thereof.

What is claimed is:

1. A method for determining the location of a receiver receiving signals from a plurality of Global Navigation Satellite System ("GNSS") satellites in which one of the received signals is erroneous, comprising the steps of:
    (a) determining an approximate location of the receiver;
    (b) for each one of the plurality of satellites:
        (i) determining an expected range between the receiver and the satellite;
        (ii) measuring a range between the receiver and the satellite;
        (iii) determining a range difference between the expected range and the measured range;
        (iv) determining a median value of the range differences;

(v) determining an offset value between the range difference and the median value;

(vi) comparing the offset value with a predetermined threshold to thereby detect an erroneous satellite measurement;

(c) determining if there are at least four offset values less than the predetermined threshold; and (d) determining the location of the receiver using the range measurements from the satellites for which the offset values are less than the predetermined threshold.

2. The method of claim 1 wherein the step of determining an approximate location of the receiver is independent of signals transmitted by the satellites and received by the receiver.

3. The method of claim 1 wherein the satellites are part of the Beidou satellite system.

4. The method of claim 3 wherein the expected range is determined as a function of the location of the satellites.

5. The method of claim 1 wherein the GNSS is selected from the group consisting of: Global Positioning System ("GPS"), Galileo, GLONASS, and Quasi-Zenith Satellite System ("QZSS").

6. The method of claim 5 wherein the expected range is determined as a function of ephemeris information transmitted by one of the satellites.

7. The method of claim 6 wherein the expected range is determined as a function of the approximate location of the receiver.

8. The method of claim 5 wherein the measured range is a function of a code phase value determined from a signal sent by the satellite and received by the receiver.

9. The method of claim 8 wherein the predetermined threshold is a code phase value greater than or equal to four.

10. The method of claim 8 wherein the predetermined threshold is a code phase value greater than or equal to two.

11. The method of claim 8 wherein the predetermined threshold is a code phase value greater than or equal to one.

12. The method of claim 1 wherein the receiver is a mobile unit.

13. The method of claim 12 wherein the mobile unit is selected from the group consisting of: cellular telephone, text messaging device, computer, portable computer, vehicle locating device, vehicle security device, communication device, and wireless receiver.

14. The method of claim 12 wherein the mobile unit receives signals from a cellular network.

15. The method of claim 14 wherein the approximate location of the receiver is a function of an area of a cell in the cellular network.

16. The method of claim 14 wherein the approximate location of the receiver is a function of a location of a base station in the cellular network.

17. The method of claim 1 wherein the expected range is a function of the approximate location of the receiver.

18. The method of claim 1 wherein the median value is an average value.

19. An apparatus for determining location from signals received from a plurality of Global Navigation Satellite System ("GNSS") satellites in which one of the received signals is erroneous, comprising:

a receiver for receiving said satellite signals;

means for determining an approximate location of the receiver;

circuitry for determining an expected range between the apparatus and the satellite;

circuitry for measuring a range between the apparatus and the satellite;

circuitry for determining a range difference between the expected range and the measured range;

circuitry for determining a median value of the range differences;

circuitry for determining an offset value between the range difference and the median value;

circuitry for comparing the offset value with a predetermined threshold to thereby detect an erroneous satellite measurement;

circuitry for determining if there are at least four offset values less than the predetermined threshold; and circuitry for determining the location of the apparatus using the range measurements from the satellites for which the offset values are less than the predetermined threshold.

20. The apparatus of claim 19 wherein the satellites are part of the Beidou satellite system.

21. The apparatus of claim 20 wherein the expected range is determined as a function of the location of the satellites.

22. The apparatus of claim 19 wherein the GNSS is selected from the group consisting of: Global Positioning System ("GPS"), Galileo, GLONASS, and Quasi-Zenith Satellite System ("QZSS").

23. The apparatus of claim 19 wherein the means for determining an approximate location of the apparatus is independent of signals transmitted by the satellites and received by the receiver.

24. The apparatus of claim 22 wherein the expected range is determined as a function of ephemeris information transmitted by one of the satellites.

25. The apparatus of claim 24 wherein the expected range is determined as a function of the approximate location of the apparatus.

26. The apparatus of claim 22 wherein the measured range is a function of a code phase value determined from a signal sent by the satellite and received by the receiver.

27. The apparatus of claim 26 wherein the predetermined threshold is a code phase value greater than or equal to four.

28. The apparatus of claim 26 wherein the predetermined threshold is a code phase value greater than or equal to two.

29. The apparatus of claim 26 wherein the predetermined threshold is a code phase value greater than or equal to one.

30. The apparatus of claim 19 wherein the receiver is a mobile unit.

31. The apparatus of claim 30 wherein the mobile unit is selected from the group consisting of: cellular telephone, text messaging device, computer, portable computer, vehicle locating device, vehicle security device, communication device, and wireless receiver.

32. The apparatus of claim 30 wherein the mobile unit receives signals from a cellular network.

33. The apparatus of claim 32 wherein the approximate location of the receiver is a function of an area of a cell in the cellular network.

34. The apparatus of claim 32 wherein the approximate location of the receiver is a function of a location of a base station in the cellular network.

35. The apparatus of claim 19 wherein the expected range is a function of the approximate location of the receiver.

36. The apparatus of claim 19 wherein the median value is an average value.

* * * * *